United States Patent
Li et al.

(10) Patent No.: US 10,627,666 B2
(45) Date of Patent: Apr. 21, 2020

(54) DISPLAY PANEL, MANUFACTURING METHOD THEREOF AND DISPLAY DEVICE THEREOF

(71) Applicant: Xiamen Tianma Micro-Electronics Co., Ltd., Xiamen (CN)

(72) Inventors: Donghua Li, Xiamen (CN); Xiaoli Wei, Xiamen (CN); Ling Wu, Xiamen (CN); Boping Shen, Xiamen (CN); Xiufeng Zhou, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 15/976,000

(22) Filed: May 10, 2018

(65) Prior Publication Data

US 2019/0235310 A1 Aug. 1, 2019

(30) Foreign Application Priority Data

Jan. 31, 2018 (CN) .......................... 2018 1 0098450

(51) Int. Cl.
*G02F 1/1335* (2006.01)
*G02F 1/1339* (2006.01)
*G02F 1/1368* (2006.01)

(52) U.S. Cl.
CPC .... *G02F 1/133516* (2013.01); *G02F 1/13394* (2013.01); *G02F 1/133512* (2013.01);
(Continued)

(58) Field of Classification Search
CPC ......... G02F 1/133516; G02F 1/133512; G02F 1/133514; G02F 1/13394; G02F 1/1368; G02F 2201/52
See application file for complete search history.

(56) References Cited

U.S. PATENT DOCUMENTS

2001/0026347 A1* 10/2001 Sawasaki .......... G02F 1/133707
349/156
2017/0153510 A1* 6/2017 Choi ................. G02F 1/133371

FOREIGN PATENT DOCUMENTS

CN 202548354 U 11/2012
CN 104317098 A 1/2015

OTHER PUBLICATIONS

Chinese Office Action dated Dec. 27, 2019 for corresponding Chinese Patent Appication No. 201810098450.7.

* cited by examiner

Primary Examiner — Nathanael R Briggs
(74) Attorney, Agent, or Firm — Tarolli, Sundheim, Covell & Tummino LLP

(57) ABSTRACT

A display panel, manufacturing method and display device are provided. The display panel includes: multiple pixel units arranged in an array, each including first sub-pixel and white sub-pixel; and color-film substrate. The color-substrate includes basis substrate and color resist layer formed on the basis substrate, wherein the color resist layer at least includes first color resist in first color resist region and compensating color resist in second color resist region, first and second color resist regions respectively corresponding to first and second sub-pixels. The color-film substrate further includes photo spacer located on one side of color resist layer away from basis substrate, orthographic projection of photo spacer on a plane where display panel is located overlaps orthographic projection of first color resist on this plane, and orthographic projection of photo spacer on this plane overlaps orthographic projection of compensating color resist on this plane.

15 Claims, 7 Drawing Sheets

(52) U.S. Cl.
CPC ...... *G02F 1/1368* (2013.01); *G02F 1/133514* (2013.01); *G02F 2201/52* (2013.01)

DISPLAY PANEL, MANUFACTURING METHOD THEREOF AND DISPLAY DEVICE THEREOF

CROSS-REFERENCE TO RELATED APPLICATIONS

The present application claims priority to Chinese Patent Application No. 201810098450.7, filed on Jan. 31, 2018, the content of which is incorporated herein by reference in its entirety.

TECHNICAL FIELD

The present disclosure relates to the technical field of displaying technologies, and in particular, to a display panel, a manufacturing method thereof and a display device thereof.

BACKGROUND

A liquid crystal display panel generally includes an array substrate and a color-film substrate arranged oppositely. The color-film substrate is provided with a plurality of color resists defined by a black matrix. The array substrate is provided with a plurality of sub-pixels defined by gate lines and data lines intersecting with each other. The plurality of sub-pixels corresponds to the plurality of color resists in one-to-one correspondence, so as to facilitate displaying different colors. Moreover, a liquid crystal layer may be filled between the array substrate and the color-film substrate, therefore, in order to form a support between the array substrate and the color-film substrate to prevent the liquid crystal layer from being squeezed, generally, a photo spacer may be provided between the array substrate and the color-film substrate. When the liquid crystal layer is squeezed by an external force, the photo spacer may maintain a casing thickness of the liquid crystal display panel to avoid an unusual casing thickness.

Currently, generally, the photo spacer is placed on adjacent color resists within the color-film substrate. However, as for a liquid crystal display panel with RGBW four-color display, no color resist is filled at a position on the color film substrate corresponding to a white sub-pixel, resulting in that a segment difference is formed between the position on the color film substrate corresponding to the white sub-pixel and a circumferential position filled with a color resist, leading to an unevenness at a location of the photo spacer. In this case, when the liquid crystal display panel is squeezed, the photo spacer will easily slide and displace, and thus deteriorating the display effect of the display panel.

SUMMARY

In view of this, the embodiments of the present disclosure provide a display panel, a manufacturing method thereof and a display device thereof, for solving a problem that a photo spacer easily slides in the related art.

In a first aspect, the present disclosure provides a display panel. The display panel includes: a plurality of pixel units arranged in an array, each of the plurality of pixel units including a first sub-pixel and a second sub-pixel, the second-pixel being a white sub-pixel; and a color-film substrate, which includes a basis substrate and a color resist layer formed on one side of the basis substrate, and the color resist layer at least includes a first color resist located in a first color resist region and a compensating color resist located in a second color resist region, the first color resist region corresponding to the first sub-pixel and the second color resist region corresponding to the white sub-pixel. The color-film substrate further includes a photo spacer, which is located on one side of the color resist layer away from the basis substrate, an orthographic projection of the photo spacer on a plane where the display panel is located overlaps an orthographic projection of the first color resist on the plane where the display panel is located, and the orthographic projection of the photo spacer on the plane where the display panel is located overlaps an orthographic projection of the compensating color resist on the plane where the display panel is located.

In a second aspect, the present disclosure provides a manufacturing method for a display panel. The display panel includes a plurality of pixel units arranged in an array and each of the plurality of pixel units includes a first sub-pixel and a white sub-pixel. The manufacturing method includes steps of: providing a basis substrate; forming a color resist layer on one side of the basis substrate, the color resist layer at least including a first color resist located in a first color resist region and a compensating color resist located in a second color resist region, the first color resist region corresponding to the first sub-pixel and the second color resist region corresponding to the white sub-pixel; forming a photo spacer on one side of the color resist layer away from the basis substrate to form a color-film substrate, and an orthographic projection of the photo spacer on a plane where the display panel is located overlaps an orthographic projection of the first color resist on the plane where the display panel is located, and the orthographic projection of the photo spacer on the plane where the display panel is located overlaps an orthographic projection of the compensating color resist on the plane where the display panel is located.

In a third aspect, the present disclosure provides a display device. The display device includes a display panel, and the display panel includes: a plurality of pixel units arranged in an array, each of the plurality of pixel units including a first sub-pixel and a second sub-pixel, the second-pixel being a white sub-pixel; and a color-film substrate, which includes a basis substrate and a color resist layer formed on one side of the basis substrate, and the color resist layer at least includes a first color resist located in a first color resist region and a compensating color resist located in a second color resist region, the first color resist region corresponding to the first sub-pixel and the second color resist region corresponding to the white sub-pixel. The color-film substrate further includes a photo spacer, which is located on one side of the color resist layer away from the basis substrate, an orthographic projection of the photo spacer on a plane where the display panel is located overlaps an orthographic projection of the first color resist on the plane where the display panel is located, and the orthographic projection of the photo spacer on the plane where the display panel is located overlaps an orthographic projection of the compensating color resist on the plane where the display panel is located.

The present disclosure can achieve several beneficial technical effects. In particular, in the technical solutions of the present disclosure, the color resist layer is provided therein with a compensating color resist located in the second color resist region, the second color resist region corresponding to the white sub-pixel, so as to make up the segment difference between a position of a correspondent white sub-pixel on the color-film substrate and a circumferential position filled with a color resist resulting from no color resist filled in the white sub-pixel. Therefore, when the photo spacer is provided on one side of the color resist away from the basis substrate, an orthographic projection of the photo spacer on a plane, where the display panel is located, overlaps an orthographic projection of the first color resist on the plane, where the display panel is located, and the orthographic projection of the photo spacer on the plane, where the display panel is located, overlaps an orthographic projection of the compensating color resist on the plane, where the display panel is located. That is to say, the photo spacer is located above the first color resist and the compensating color resist, and is supported by the first color resist and the compensating color resist, so that the photo spacer can be placed stably above the color resist layer, so as to avoid sliding of the photo spacer and thus improve a display effect of a display device.

BRIEF DESCRIPTION OF DRAWINGS

In order to more clearly illustrate technical solutions of embodiments of the present disclosure, the accompanying drawings used for describing the embodiments are briefly described below. The drawings described below are merely a part of the embodiments of the present disclosure. Based on these drawings, those skilled in the art can obtain other drawings without any creative effort.

DESCRIPTION OF EMBODIMENTS

Figure 1:
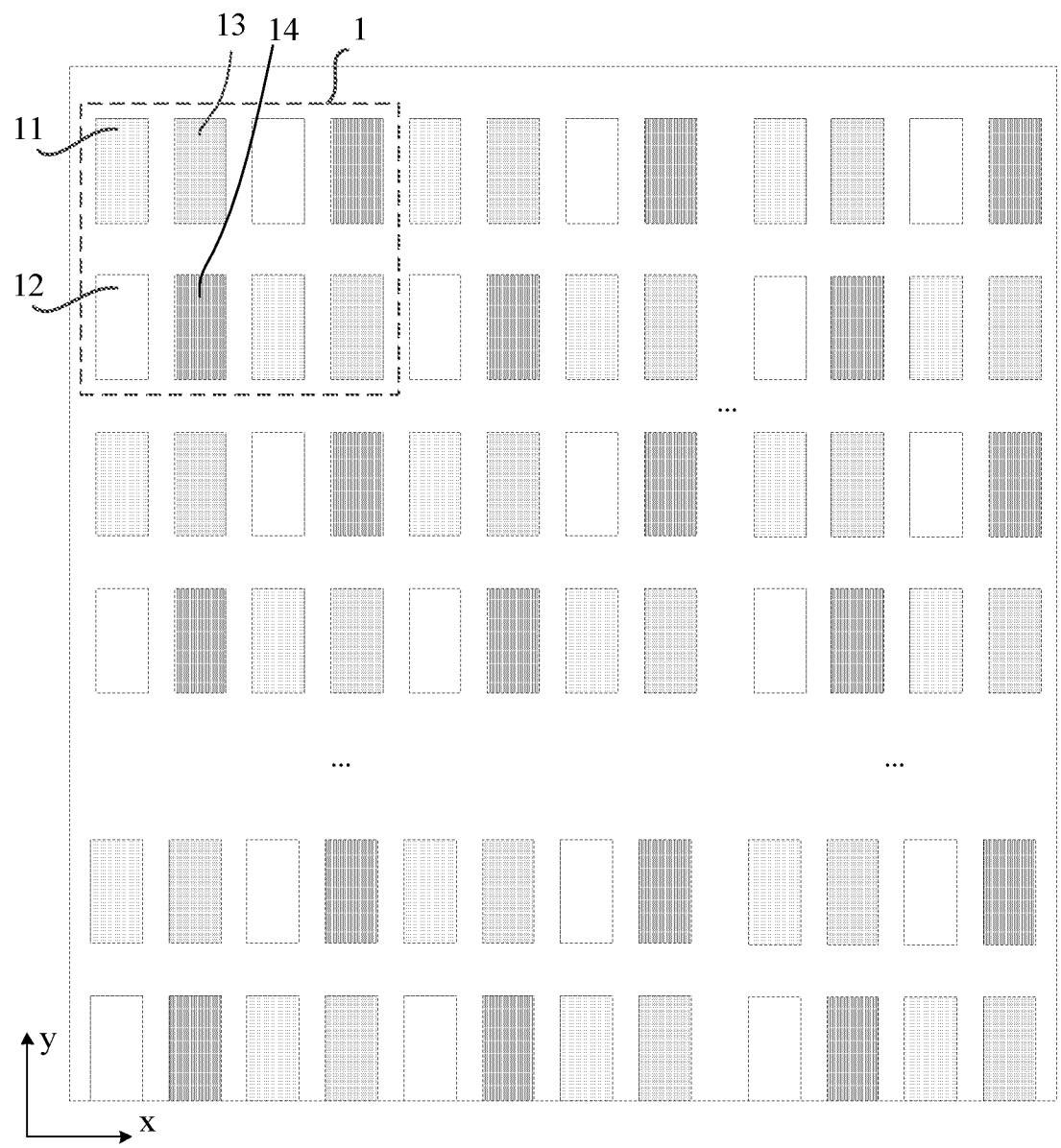
FIG. 1 is a top view of a display panel provided by an embodiment of the present disclosure.

In order to better illustrate the technical solutions of the present disclosure, the embodiments of the present disclosure will be described in detail by referring to the drawings.

It should be noted that the described embodiments are merely part of the embodiments of the present disclosure rather than all of the embodiments. All other embodiments obtained by those skilled in the art without paying creative labor shall fall into the protection scope of the present disclosure.

The terms used in the embodiments of the present disclosure are merely for the purpose of describing specific embodiments, rather than limiting the present disclosure. The terms "a", "an", "the" and "said" in a singular form in the embodiment of the present disclosure and the attached claims are also intended to include plural forms thereof, unless noted otherwise.

It should be understood that, although the terms such as "first", "second" or the like may be used to indicate sub-pixels in the embodiments of the present disclosure, but such sub-pixels should not be limited by these terms. Such terms are merely used to distinguish these sub-pixels from one another. For example, under the circumstance of not going beyond the scope of the present disclosure, a "first" sub-pixel may be referred to as a "second" sub-pixel. Similarly, a "second" sub-pixel may also be referred to as a "first" sub-pixel.

Figure 2:
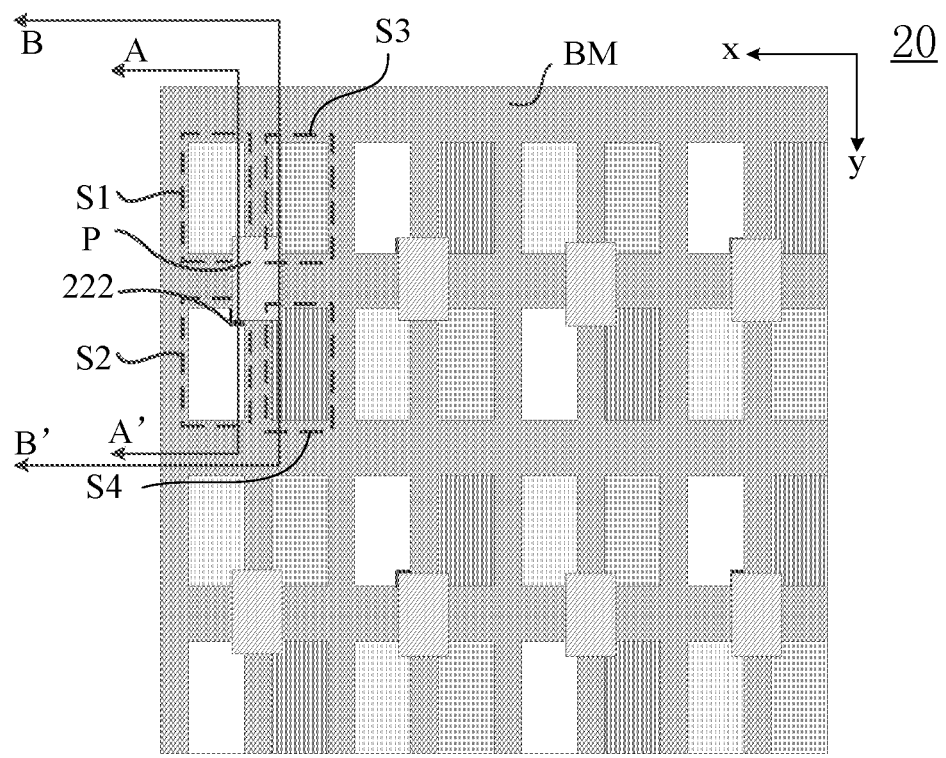
FIG. 2 is a top view of a color-film substrate of a display panel provided by an embodiment of the present disclosure.
Figure 3:
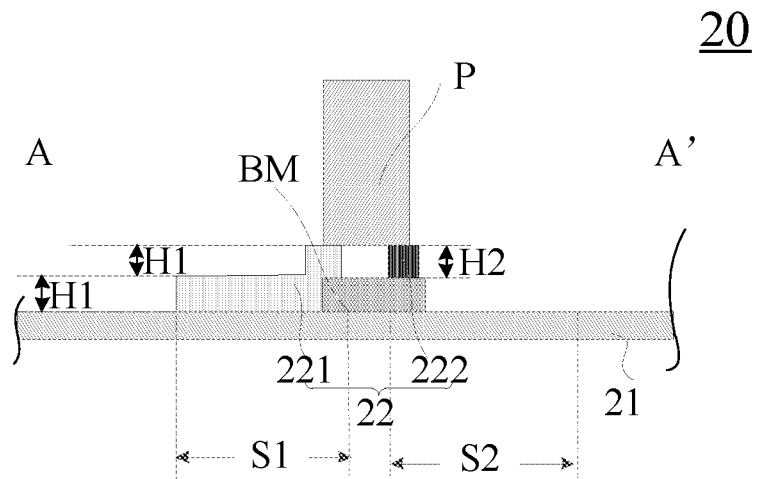
FIG. 3 is a schematic diagram of a cross section along a line AA' in FIG. 2.

An embodiment of the present disclosure provides a display panel, as shown in FIG. 1, which is a top view of the display panel according to an embodiment of the present disclosure. The display panel includes a plurality of pixel units 1 arranged in an array. Each pixel unit 1 includes a first sub-pixel 11 and a second sub-pixel 12, and the second sub-pixel 12 is a white sub-pixel 12 (in FIG. 1, different filling characteristics represent different sub-pixels). The display panel further includes a color-film substrate 20, as shown in FIGS. 2 and 3. FIG. 2 is a top view of a color-film substrate of a display panel according to an embodiment of the present disclosure, and FIG. 3 is a schematic diagram showing a cross section along a line AA' in FIG. 2. The color-film substrate 20 includes a basis substrate 21 and a color resist layer 22 on one side of the basis substrate 21. The color resist layer 22 at least includes a first color resist 221 located in a first color resist region S1 and a compensating color resist 222 located in a second color resist region S2. The first color resist region S1 corresponds to the first sub-pixel 11, and the second color resist region S2 corresponds to the white sub-pixel 12.

The color-film substrate 20 further includes a photo spacer P, which is located on one side of the color resist layer 22 away from the basis substrate 21, as shown in FIGS. 2 and 3. An orthographic projection of the photo spacer P on a plane, where the display panel is located, overlaps an orthographic projection of the first color resist 221 on the plane, where the display panel is located. The orthographic projection of the photo spacer P on the plane, where the display panel is located, overlaps an orthographic projection of the compensating color resist 222 on the plane, where the display panel is located.

With the display panel provided by the present embodiment, the color resist layer 22 is provided therein with the compensating color resist 222 located in the second color resist region S2 and corresponding to the white sub-pixel 12, so as to make up for the segment difference between a position of a white sub-pixel 12 on the color-film substrate 20 and a circumferential position filled with a color resist resulting from that no color resist is filled in the white sub-pixel 12. Therefore, when the photo spacer P is provided on one side of the basis substrate 21 away from the color resist layer 22, as the orthographic projection of the photo spacer P on the plane, where the display panel is located, overlaps the orthographic projection of the first color resist 221 on the plane, where the display panel is located, the orthographic projection of the photo spacer P on the plane, where the display panel is located, overlaps an orthographic projection of the compensating color resist 222 on the plane, where the display panel is located, that is, the photo spacer P is located above the first color resist 221 and the compensating color resist 222, and is supported by the first color resist 221 and the compensating color resist 222, so that the photo spacer P can be placed stably above the color resist 22, so as to avoid sliding of the photo spacer P and thus realize a better display effect.

It should be clarified that, the position and number of the photo spacer(s) P shown in FIGS. 2 and 3 are merely exemplary. In an actual configuration, the photo spacers P may be provided densely. For example, a photo spacer P may be provided at a junction position between any adjacent two sub-pixels in the display panel. The photo spacers P may also be provided sparsely to decrease the number of the photo spacer(s) P. For example, a photo spacer P may be provided at a junction position between only some (not all) adjacent sub-pixels in the display panel. The present embodiment does not make any limitation for this.

In an example, as shown in FIG. 3, wherein a first thickness H1 means a thickness of the first color resist 221 in a direction perpendicular to the plane where the display panel is located, and a compensating thickness H2 means a thickness of the compensating color resist 222 in the direction perpendicular to the plane where the display panel is located. The compensating thickness H2 is equal to the first thickness H1. When the photo spacer P is placed above the first color resist 221 and the compensating color resist 222, since the first thickness H1 is equal to the compensating thickness H2, the photo spacer P can be placed stably on the first color resist 221 and the compensating color resist 222, so as to alleviate the problem that the photo spacer P easily slides due to no color resist being filled in the second color resist region S2 in the related art.

Further refer to FIGS. 2 and 3. The color film substrate 20 further includes a black matrix BM between the basis substrate 21 and the color resist layer 22. The orthographic projection of the compensating color resist 222 on the plane where the display panel is located is located in an orthographic projection of the black matrix BM on the plane where the display panel is located. In an embodiment, the black matrix BM is used to shield the compensating color resist 222, so that the compensating color resist 222 would not deteriorate the normal lighting of the white sub-pixel 12 in the second color resist region S2 where the compensating color resist 222 is located, so as to improve the display effect of the display panel.

Figure 4:
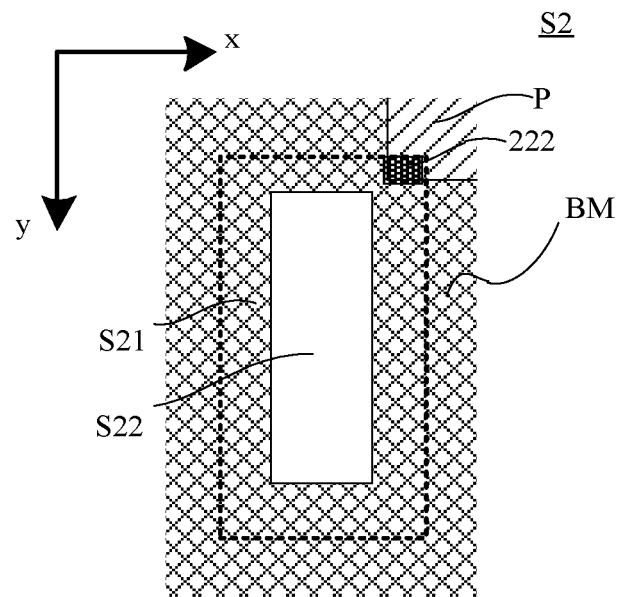
FIG. 4 is a magnified schematic diagram of a second color resist region S2 in FIG. 2.

With further reference to FIG. 1, the first sub-pixels 11 and the white sub-pixels 12 are arranged in a column direction y. As shown in FIG. 4, FIG. 4 is a magnified schematic diagram of the second color resist region S2 in FIG. 2. The second color resist region S2 includes a second overlapping region S21 and a second non-overlapping region S22. The orthographic projection of the second overlapping region S21 on the plane where the display panel is located is located in the orthographic projection of the black matrix BM on the plane where the display panel is located. The orthographic projection of the second non-overlapping region S22 on the plane where the display panel is located does not overlap the orthographic projection of the black matrix BM on the plane where the display panel is located.

The present embodiment provides the black matrix BM, and the orthographic projection of the second overlapping region S21 of the second color resist region S2 on the plane where the display panel is located is located in the orthographic projection of the black matrix BM on the plane where the display panel is located, that is, the present embodiment provides the black matrix in the second overlapping region S21 located in the second color resist region S2. In this case, the second non-overlapping region S22 in the second color resist region S2 is separated from a circumferential color resist region(s), so as to avoid a color-mixture phenomenon between the color resists closer to each other and thus improve the display effect of the display panel.

Figure 5:
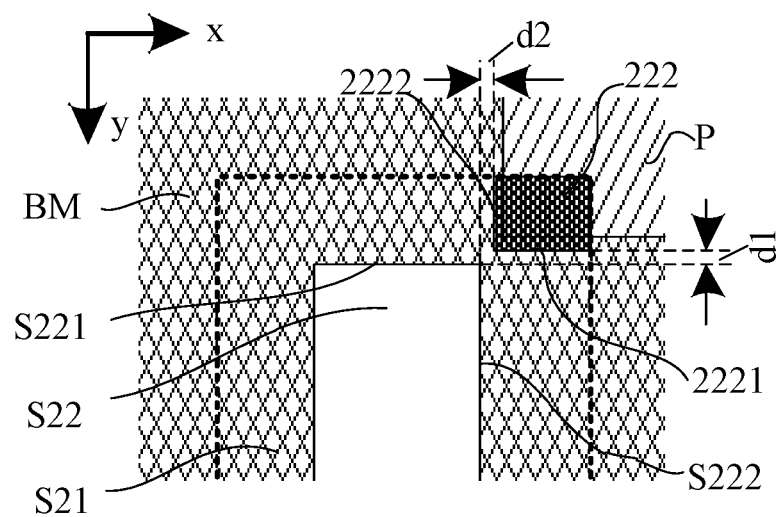
FIG. 5 is a magnified schematic diagram of an upper-half portion of the second color resist region S2 in FIG. 4.

FIG. 5 is a magnified schematic diagram of an upper-half portion of the second color resist region S2 in FIG. 4. As shown in FIG. 5, along the column direction y, the compensating color resist 222 includes a first edge 2221, and the second non-overlapping region S22 includes a second edge S221. The first edge 2221 is an edge of the compensating color resist 222 close to the second non-overlapping region S2 along the column direction y. The second edge S221 is an edge of the second non-overlapping region S22 close to the compensating color resist 222 along the column direction y.

Along a row direction x, the compensating color resist 222 includes a third edge 2222, and the second non-overlapping region S2 includes a fourth edge S222. The third edge 2222 is an edge of the compensating color resist 222 close to the second non-overlapping region S2 along the row direction x. The fourth edge S222 is an edge of the second non-overlapping region S22 close to the compensating color resist 222 along the row direction x.

Further, in an embodiment, a distance d1 between the first edge 2221 and the second edge S221 is greater than 3 μm, or a distance d2 between the third edge 2222 and the fourth edge S222 is greater than 3 μm. In this case, in an actual manufacturing process, it can avoid the possibility of the compensating color resist 222 entering the second non-overlapping region S22 if the compensating color resist 222 is too close to the second non-overlapping region S22, so as to avoid the possibility that the normal lighting of the white sub-pixel in the second color resist region S2 is deteriorated due to the compensating color resist 222 entering the second non-overlapping region S22, and thus improve the display effect.

Further, in an embodiment, the distance d1 between the first edge 2221 and the second edge S221 is greater than 3 μm, and the distance d2 between the third edge 2222 and the fourth edge S222 is also greater than 3 μm. In this case, in both the column direction and the row direction, the distance between the compensating color resist 222 and the second non-overlapping region S22 is avoided to be too short, so as to achieve the normal lighting of the white sub-pixel in the second color resist region S2.

It should be noted that, as shown in FIGS. 4 and 5, the compensating color resist 222 is located in the second overlapping region S21, and the second non-overlapping region S22 includes no color resist layer, so that the second color resist region S2 can normally display white light.

Figure 6:
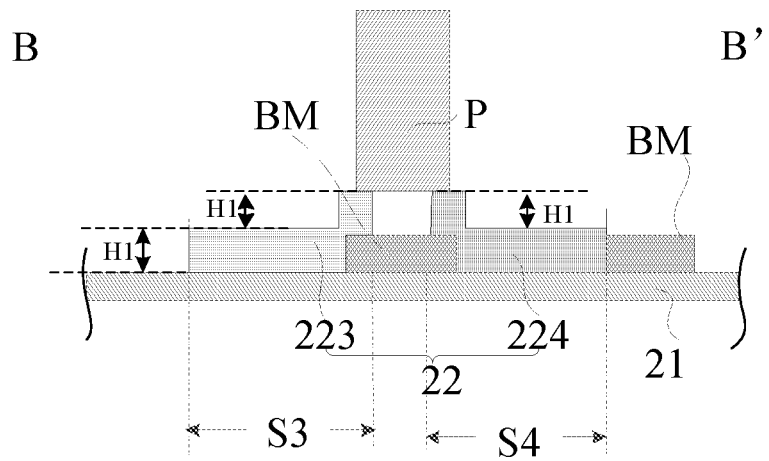
FIG. 6 is a schematic diagram of a cross section along a line BB' in FIG. 2.

FIG. 6 is a schematic diagram of a cross section along a line BB' in FIG. 2. In an example, as shown in FIGS. 1, 2 and 6, each pixel unit 1 further includes a third sub-pixel 13 and a fourth sub-pixel 14, and the color resist layer 22 further includes a third color resist 223 in the third color resist region S3 and a fourth color resist 224 in the fourth color resist region S4. The third color resist region S3 corresponds to the third sub-pixel 13, and the fourth color resist S4 corresponds to the fourth sub-pixel 14. The third color resist 223 has a thickness in a direction perpendicular to the plane where the display panel is located, which is equal to the first thickness H1. The fourth color resist 224 has a thickness in a direction perpendicular to the plane where the display panel is located, which is equal to the first thickness H1. As shown in FIG. 1, the orthographic projection of the photo spacer P on the plane where the display panel is located overlaps the orthographic projection of the third color resist 223 on the plane where the display panel is located, and the orthographic projection of the photo spacer P on the plane where the display panel is located overlaps the orthographic projection of the fourth color resist 224 on the plane where the display panel is located. For example, the first color resist 221, the third color resist 223 and the fourth color resist 224 may be a red color resist, a green color resist and a blue color resist, respectively. In the present embodiment, the photo spacer P is provided above adjacent four sub-pixels, and is supported by the color resists in four color resist regions, so as to achieve a stable placement of the photo spacer P.

In an example, the compensating color resist 222 includes any one of a red compensating color resist, a green compensating color resist and a blue compensating color resist. In this case, when the display panel is manufactured, the compensating color resist 222 and any one of the first color resist 221, the third color resist 223 and the fourth color resist 224 can be manufactured in a same manufacturing process, without any additional process.

Optionally, with further reference to FIG. 1, each pixel unit 1 includes eight sub-pixels, which are arranged in an array including two rows and four columns. The sub-pixels in a first row include a first sub-pixel 11, a third sub-pixel 13, a white sub-pixel 12 and a fourth sub-pixel 14 arranged in sequence. The sub-pixels in a second row include a white sub-pixel 12, a fourth sub-pixel 14, a first sub-pixel 11 and a third sub-pixel 13 arranged in sequence.

Figure 7:
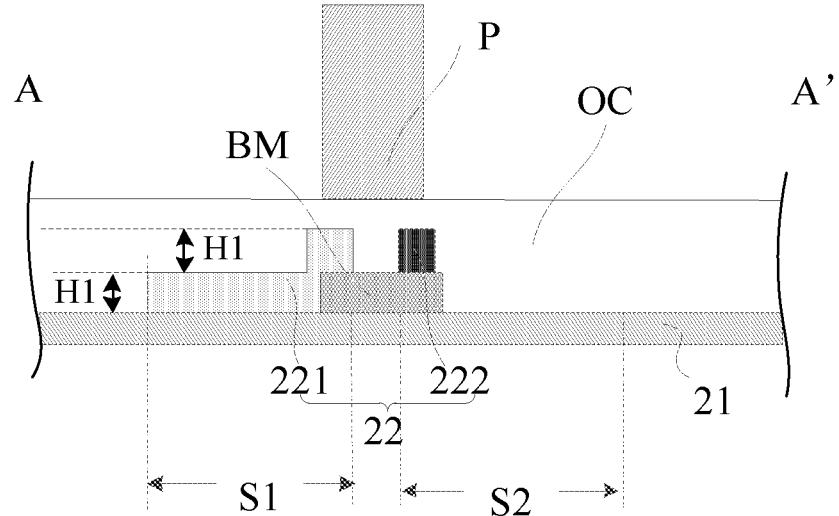
FIG. 7 is a schematic diagram of another cross section along a line AA' in FIG. 2.

In the embodiments of the present disclosure, the color-film substrate 20 may be provided with additional layer(s). FIG. 7 is a schematic diagram of another cross section along a line AA' in FIG. 2, for example, as shown in FIG. 7, the color-film substrate 20 further includes an over coating layer OC, which is located on one side of the color resist layer 22 away from the basis substrate 21 and completely covers the first color resist region S1, the second color resist region S2, the third color resist region S3, the fourth color resist region S4 and the black matrix BM. The photo spacer P is located on one side of the over coating layer OC away from the basis substrate 21. The over coating layer OC can not only protect the black matrix BM and the color resist layer 22, but also flatten one side of the black matrix BM and the color resist layer 22 away from the basis substrate 21, so as to provide liquid crystal molecules with a flatter orientation platform, and thus avoiding a problem of bad frictional alignment. The over coating layer OC also benefits the forming of subsequent additional mechanism(s) in the display panel.

Figure 8:
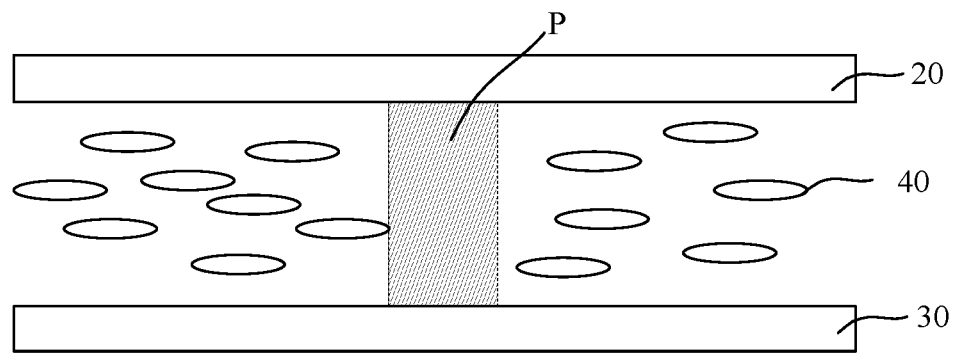
FIG. 8 is a schematic diagram of a cross sectional structure of a display panel provided by an embodiment of the present disclosure.
Figure 9:
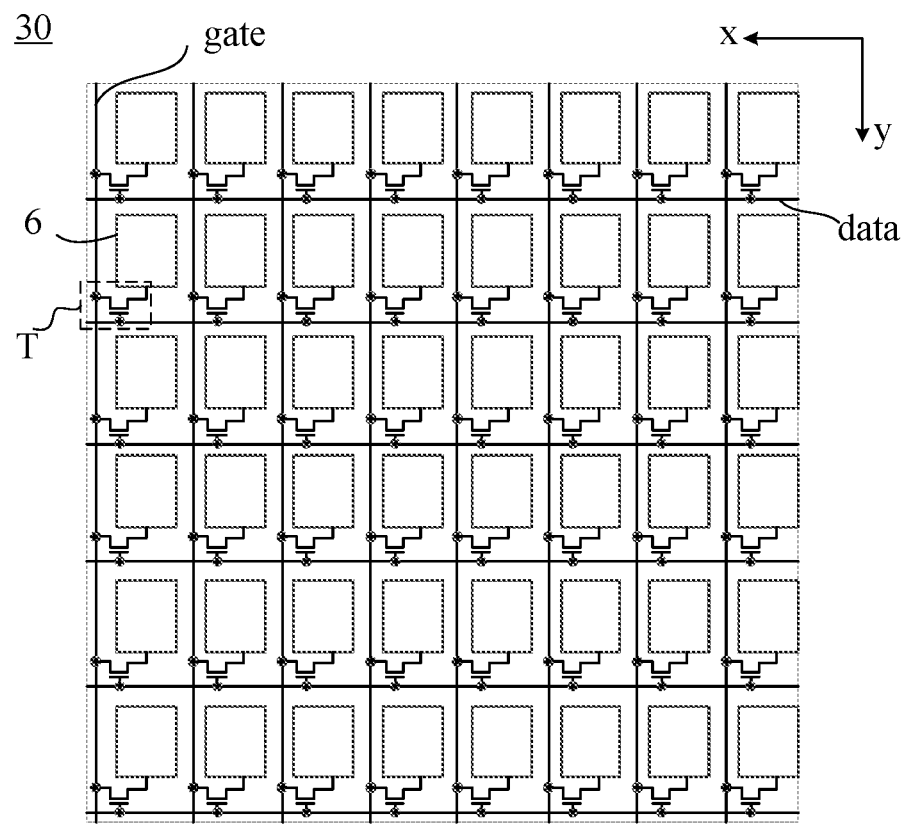
FIG. 9 is a top view of an array substrate of a display panel provided by an embodiment of the present disclosure.

FIG. 8 is a schematic diagram of a cross sectional structure of a display panel provided by an embodiment of the present disclosure. In an example, as shown in FIG. 8, the display panel further includes an array substrate 30, which is provided to be opposite to the color-film substrate 20. A liquid crystal layer 40 is filled between the array substrate 30 and the color-film substrate 20. The photo spacer P is located on one side of the color-film substrate 20 close to the array substrate 30. FIG. 9 is a top view of an array substrate of a display panel provided by an embodiment of the present disclosure. As shown in FIG. 9, a plurality of gate lines GATE arranged in the column direction y and a plurality of data lines DATA arranged in the row direction x are provided on the array substrate 30. The plurality of gate lines GATE intersects with and is isolated from the plurality of data lines DATA to define a plurality of sub-pixel regions corresponding to the sub-pixels in the display panel in one-to-one correspondence. Each sub-pixel region is provided therein with a display electrode and a thin-film transistor T. The display electrode includes a pixel electrode 6 and a common electrode (not shown in the figures). A source electrode of the thin-film transistor T is electrically connected to the data line DATA, a drain electrode thereof is electrically connected to the pixel electrode 6, and a gate electrode thereof is electrically connected to the gate line GATE. In addition, the array substrate 30 of the embodiment of the present disclosure further includes the common electrode and the like not shown in FIG. 9, which can be selected by the skilled in the art as required. When the display panel is in operation, a deflection angle of liquid crystal molecular can be controlled by an electrical field between the pixel electrode and the common electrode, so as to realize picture display.

It should be noted that, the above display panel only shows a region where a display region for picture displaying is located. Besides, the display panel further includes a non-display region surrounding the display region, which is provided with a drive circuit and the like. The drive circuit is used to send signal(s) to gate lines GATE, data lines DATA, the common electrode and the like, which would not be illustrated in details herein.

Figure 10:
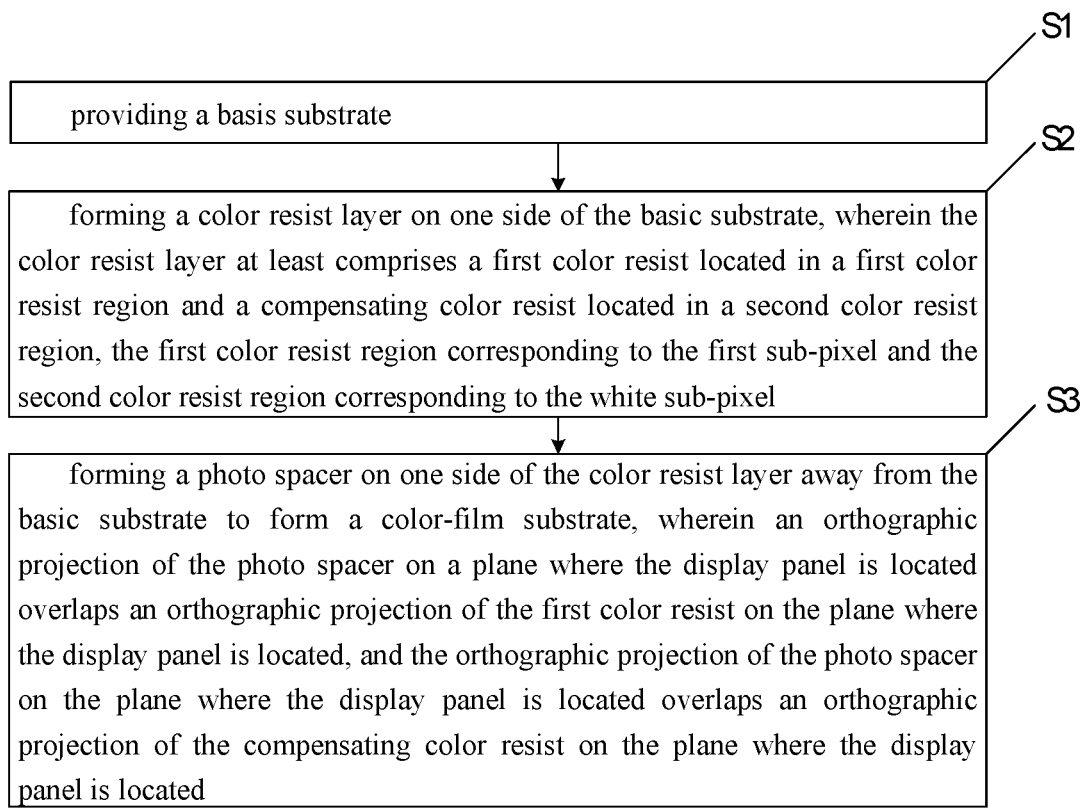
FIG. 10 is a flow chart of a manufacturing method for a display panel provided by an embodiment of the present disclosure.

The present disclosure further provides a manufacturing method for the display panel, as shown in FIGS. 2, 3 and 10. FIG. 10 is a flow chart for showing the manufacturing method for the display panel provided by an embodiment of the present disclosure. The manufacturing method includes following steps: S1, providing a basis substrate 21; S2, forming a color resist layer 22 on one side of the basis substrate 21, wherein the color resist layer 22 at least includes a first color resist 221 in a first color resist region S1 and a compensating color resist 222 in a second color resist region S2, the first color resist region S1 corresponding to a first sub-pixel 11, and the second color resist region S2 corresponding to a white sub-pixel 12; and S3, forming a photo spacer P on one side of the color resist layer 22 away from the basis substrate 21 to form a color-film substrate 20, wherein an orthographic projection of the photo spacer P on a plane where the display panel is located overlaps an orthographic projection of the first color resist 221 on the plane where the display panel is located, and the orthographic projection of the photo spacer P on the plane where the display panel is located overlaps an orthographic projection of the compensating color resist 222 on the plane where the display panel is located.

In the present embodiment, the display panel is manufactured by the above manufacturing method. The color resist layer 22 is provided therein with the compensating color resist 222 located in the second color resist region S2 and corresponding to the white sub-pixel 12, so as to make up the segment difference between the position of the correspondent white sub-pixel 12 on the color-film substrate 20 and the circumferential position filled with color resist(s) resulting from that no color resist is filled in the white sub-pixel 12. Therefore, when the photo spacer P is provided on one side of the color resist layer 22 away from the basis substrate 21, as the orthographic projection of the photo spacer P on the plane where the display panel is located overlaps an orthographic projection of the first color resist 221 on the plane where the display panel is located, and the orthographic projection of the photo spacer P on the plane where the display panel is located overlaps an orthographic projection of the compensating color resist 222 on the plane where the display panel is located, that is, the photo spacer P is located above the first color resist 221 and the compensating color resist 222, and the photo spacer P is supported by the first color resist 221 and the compensating color resist 222, so that the photo spacer P can be stably placed above the color resist layer 22 to avoid the sliding of the photo spacer P.

Figure 11:
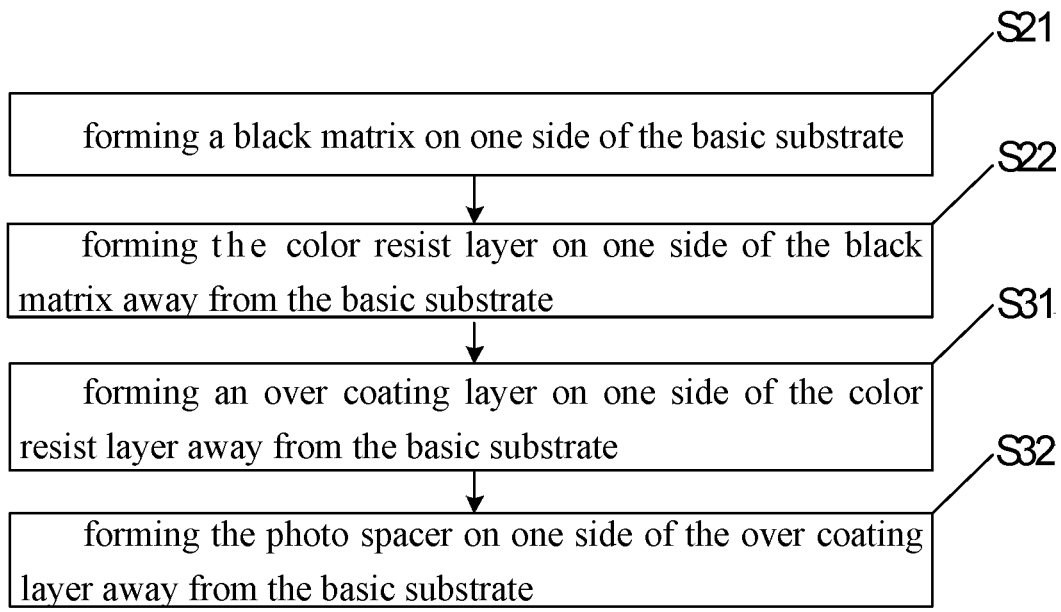
FIG. 11 is another flow chart of a manufacturing method for a display panel provided by an embodiment of the present disclosure.

FIG. 11 is another flow chart of a manufacturing method for the display panel provide by an embodiment of the present disclosure. In an example, as shown in FIGS. 3 and 11, "forming a color resist layer 22 on one side of the basis substrate 21" in the above-mentioned step S2 includes following steps: S21, forming a black matrix BM on one side of the basis substrate 21, wherein, for example, a black resin layer may be coated on one side of the basis substrate 21 and then the black matrix BM will be formed by a picture composition process; and S22, forming a color resist layer 22 on one side of the black matrix BM away from the basis substrate 21, wherein, for example, the color resist layer 22 may be manufactured by a pigment dispersion process, a staining process, a reverse printing process, a thermal multilayer technology, an inkjet printing process or the like.

The "forming a photo spacer P on one side of the color resist layer 22 away from the basis substrate 21" in the above-mentioned step S3 includes following steps: S31, forming an over coating layer OC on one side of the color resist layer 22 away from the basis substrate 21, wherein, for example, the over coating layer OC may be manufactured on one side of the color resist layer 22 away from the basis substrate 21 in a brush coating way; and S32, forming a photo spacer P on one side of the over coating layer OC away from the color resist layer 22, wherein, for example, a photosensitive material is coated on one side of the over coating layer OC away from the color resist layer 22, an then the photosensitive material is illuminated by ultraviolet rays by means of a mask plate, so that the photosensitive material at a corresponding position is exposed, solidified and then developed to form the photo spacer P.

Figure 12:
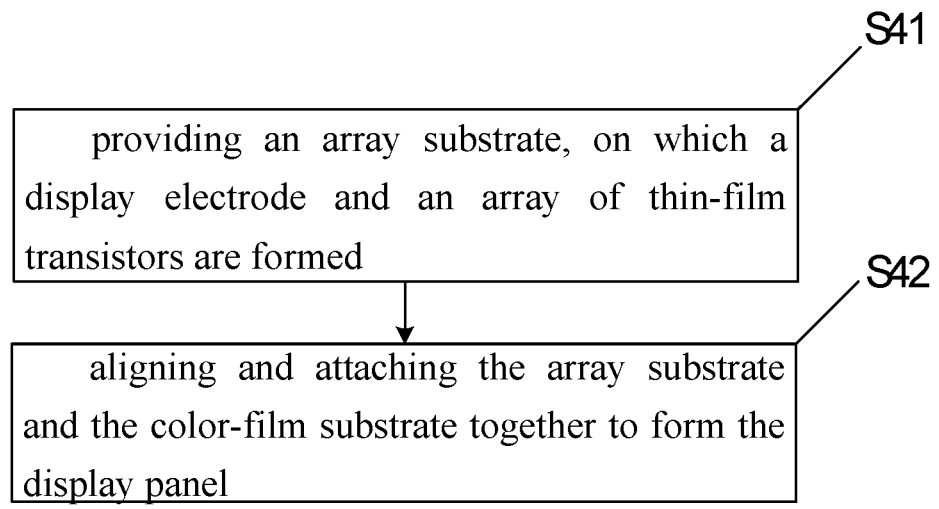
FIG. 12 is still another flow chart of a manufacturing method for a display panel provided by an embodiment of the present disclosure.

In addition, FIG. 12 is still another flow chart of a manufacturing method for the display panel provided by the present embodiment. As shown in FIGS. 8 and 12, the above manufacturing method further includes following steps: S41, providing an array substrate 30, which is provided thereon with a display electrode and thin-film transistor array; and S42, aligning and attaching the array substrate 30 and the color-film substrate 20 together to form the display panel.

It should be understood that, the above step S41 is allowed to be conducted at the same time as the steps S1-S3, or it is also allowed to first conduct the steps S1-S3 and then conduct the step S41, or it is also allowed to first conduct the step S41 and then conduct the steps S1-S3, which will not be limited by the embodiments.

In addition, the manufacturing method for other part(s) of the display panel may be achieved by any method in the related art, which would not be illustrated in details herein.

Figure 13:
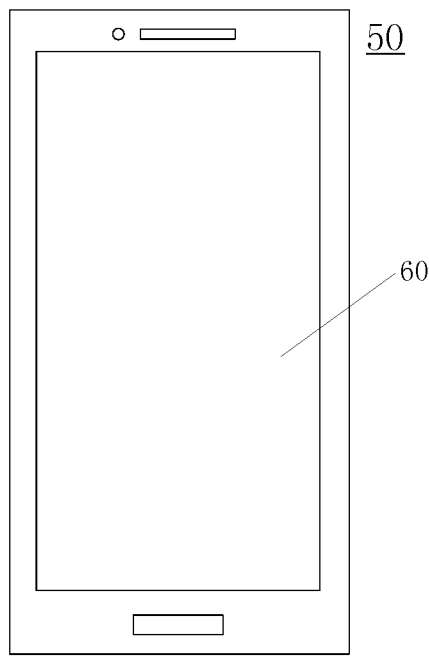
FIG. 13 is a structural diagram of a display device provided by an embodiment of the present disclosure.

The present disclosure further provides a display device 50, as shown in FIG. 13, FIG. 13 is a structural schematic diagram of a display device provided by an embodiment of the present disclosure. The display device 50 includes the above-mentioned display panel 60. The structure of the display panel has been illustrated in the above embodiments, which would not be illustrated in details herein. The display device shown in FIG. 13 is only exemplary. For example, the display device may be a cellphone, a tablet computer, a laptop, an E-book, a television or any other electronic device with a display function.

In the display device 50 provided by the present disclosure, the color resist layer is provided therein with a compensating color resist located in the second color resist region, the second color resist corresponding to the white sub-pixel, so as to make up for the segment difference between a position of a correspondent white sub-pixel on the color-film substrate and a circumferential position filled with a color resist resulting from that no color resist is filled in the white sub-pixel. Therefore, when the photo spacer is provided on one side of the color resist away from the basis substrate, as an orthographic projection of the photo spacer on a plane where the display panel is located overlaps an orthographic projection of the first color resist on the plane where the display panel is located, and the orthographic projection of the photo spacer on the plane where the display panel is located overlaps an orthographic projection of the compensating color resist on the plane where the display panel is located, that is, the photo spacer is located above the first color resist and the compensating color resist, and is supported by the first color resist and the compensating color resist, so that the photo spacer can be stably placed above the color resist layer, so as to avoid sliding of the photo spacer and thus improve a display effect of a display device.

Finally, it should be noted that the above embodiments are merely used to illustrate technical solutions of the present disclosure, rather than to limit the present disclosure. Although the present disclosure is described in detail with reference to the above embodiments, those skilled in the art shall understand that it is still possible to modify the technical solutions described in the above embodiments or to replace some or all of the technical features thereof with equivalent ones, without departing from the essence and the protection scope of the technical solutions of the embodiments of the present disclosure.

What is claimed is:

1. A display panel, comprising:
   a plurality of pixel units arranged in an array, each of the plurality of pixel units comprising a first sub-pixel and a second sub-pixel, the second sub-pixel being a white sub-pixel; and
   a color-film substrate, which comprises a basis substrate and a color resist layer formed on one side of the basis substrate, wherein the color resist layer at least comprises a first color resist located in a first color resist region and a compensating color resist located in a second color resist region, the first color resist region corresponding to the first sub-pixel and the second color resist region corresponding to the white sub-pixel;
   wherein the color-film substrate further comprises a photo spacer, which is located on one side of the color resist layer away from the basis substrate, an orthographic projection of the photo spacer on a plane where the display panel is located overlaps an orthographic projection of the first color resist on the plane where the display panel is located, and the orthographic projection of the photo spacer on the plane where the display panel is located overlaps an orthographic projection of the compensating color resist on the plane where the display panel is located; and
   the color-film substrate further comprises a black matrix located between the basis substrate and the color resist layer, the orthographic projection of the compensating color resist on the plane where the display panel is located is located completely within an orthographic projection of the black matrix on the plane where the display panel is located, and the black matrix is in direct contact with the compensating color resist.

2. The display panel according to claim 1, wherein a thickness of the first color resist in a direction perpendicular to the plane where the display panel is located is a first thickness, a thickness of the compensating color resist in the direction perpendicular to the plane where the display panel is located is a compensating thickness, and the compensating thickness is equal to the first thickness.

3. The display panel according to claim 1, wherein the first sub-pixel and the white sub-pixel are arranged in a column direction, the second color resist region comprises a second overlapping region and a second non-overlapping region, an orthographic projection of the second overlapping region on the plane where the display panel is located is located in the orthographic projection of the black matrix on the plane where the display panel is located; and an orthographic projection of the second non-overlapping region on the plane where the display panel is located does not overlap the orthographic projection of the black matrix on the plane where the display panel is located;

along the column direction, the compensating color resist comprises a first edge, and the second non-overlapping region comprises a second edge; along a row direction, the compensating color resist comprises a third edge, and the second non-overlapping region comprises a fourth edge; the first edge is an edge of the compensating color resist close to the second non-overlapping region along the column direction; the second edge is an edge of the second non-overlapping region close to the compensating color resist along the column direction; the third edge is an edge of the compensating color resist close to the second non-overlapping region along the row direction; the fourth edge is an edge of the second non-overlapping region close to the compensating color resist along the row direction.

4. The display panel according to claim 3, wherein a distance between the first edge and the second edge is greater than 3 µm.

5. The display panel according to claim 3, wherein a distance between the third edge and the fourth edge is greater than 3 µm.

6. The display panel according to claim 3, wherein the compensating color resist is located in the second overlapping region.

7. The display panel according to claim 1, wherein each of the plurality of pixel units comprises a third sub-pixel and a fourth sub-pixel; the color resist layer further comprises a third color resist located in a third color resist region and a fourth color resist located in a fourth color resist region, the third color resist corresponding to the third sub-pixel and the fourth color resist corresponding to the fourth sub-pixel; and wherein a thickness of the first color resist in a direction perpendicular to the plane where the display panel is located is a first thickness, and a thickness of the third color resist in a direction perpendicular to the plane where the display panel is located is equal to the first thickness, and a thickness of the fourth color resist in the direction perpendicular to the plane where the display panel is located is equal to the first thickness; and the orthographic projection of the photo spacer on the plane where the display panel is located overlaps an orthographic projection of the third color resist on the plane where the display panel is located, and the orthographic projection of the photo spacer on the plane where the display panel is located overlaps an orthographic projection of the fourth color resist on the plane where the display panel is located.

8. The display panel according to claim 7, wherein the compensating color resist comprises any one of a red compensating color resist, a green compensating resistance or a blue compensating color resist.

9. The display panel according to claim 7, wherein each of the plurality of pixel units comprises eight sub-pixels, which are arranged in an array comprising two rows and four columns, wherein sub-pixels in a first row comprise the first sub-pixel, the third sub-pixel, the white sub-pixel and the fourth sub-pixel arranged in sequence, and sub-pixels in a second row comprise the white sub-pixel, the fourth sub-pixel, the first sub-pixel and the third sub-pixel arranged in sequence.

10. The display panel according to claim 1, wherein the color-film substrate further comprises an over coating layer, which is located on one side of the color resist layer away from the basis substrate, and the photo spacer is located on one side of the over coating layer away from the basis substrate.

11. The display panel according to claim 1, wherein the display panel further comprises an array substrate, which is provided to be opposite to the color-film substrate, the photo spacer being located on one side of the color-film substrate close to the array substrate.

12. A manufacturing method for a display panel, the display panel comprising a plurality of pixel units arranged in an array and each of the plurality of pixel units comprising a first sub-pixel and a white sub-pixel, wherein the manufacturing method comprises steps of:

providing a basis substrate;

forming a color resist layer on one side of the basis substrate, wherein the color resist layer at least comprises a first color resist located in a first color resist region and a compensating color resist located in a second color resist region, the first color resist region corresponding to the first sub-pixel and the second color resist region corresponding to the white sub-pixel;

forming a photo spacer on one side of the color resist layer away from the basis substrate to form a color-film substrate, wherein an orthographic projection of the photo spacer on a plane where the display panel is located overlaps an orthographic projection of the first color resist on the plane where the display panel is located, and the orthographic projection of the photo spacer on the plane where the display panel is located overlaps an orthographic projection of the compensating color resist on the plane where the display panel is located;

wherein forming a color resist layer on one side of the basis substrate comprises steps of:

forming a black matrix on one side of the basis substrate; and forming the color resist layer on one side of the black matrix away from the basis substrate, wherein the orthographic projection of the compensating color resist on the plane where the display panel is located is located completely within an orthographic projection of the black matrix on the plane where the display panel is located, and the black matrix is in direct contact with the compensating color resist.

13. The manufacturing method according to claim 12, wherein forming the photo spacer on one side of the color resist layer away from the basis substrate comprises steps of:

forming an over coating layer on one side of the color resist layer away from the basis substrate; and forming the photo spacer on one side of the over coating layer away from the basis substrate.

14. The manufacturing method according to claim 12, wherein the manufacturing method further comprises steps of:
- providing an array substrate, on which a display electrode and an array of thin-film transistors are formed;
- aligning and attaching the array substrate and the color-film substrate together to form the display panel.

15. A display device, comprising a display panel, wherein the display panel comprises:
- a plurality of pixel units arranged in an array, each of the plurality of pixel units comprising a first sub-pixel and a second sub-pixel, the second sub-pixel being a white sub-pixel; and
- a color-film substrate, which comprises a basis substrate and a color resist layer formed on one side of the basis substrate, wherein the color resist layer at least comprises a first color resist located in a first color resist region and a compensating color resist located in a second color resist region, the first color resist region corresponding to the first sub-pixel and the second color resist region corresponding to the white sub-pixel;
- wherein the color-film substrate further comprises a photo spacer, which is located on one side of the color resist layer away from the basis substrate, an orthographic projection of the photo spacer on a plane where the display panel is located overlaps an orthographic projection of the first color resist on the plane where the display panel is located, and the orthographic projection of the photo spacer on the plane where the display panel is located overlaps an orthographic projection of the compensating color resist on the plane where the display panel is located; and
- the color-film substrate further comprises a black matrix located between the basis substrate and the color resist layer, the orthographic projection of the compensating color resist on the plane where the display panel is located is located completely within an orthographic projection of the black matrix on the plane where the display panel is located, and the black matrix is in direct contact with the compensating color resist.

* * * * *